June 12, 1962

C. P. GUNSON 3,038,421

MOBILE INCINERATOR

Filed July 30, 1959

INVENTOR.
CECIL P. GUNSON

BY

McGrew and Edwards
ATTORNEYS

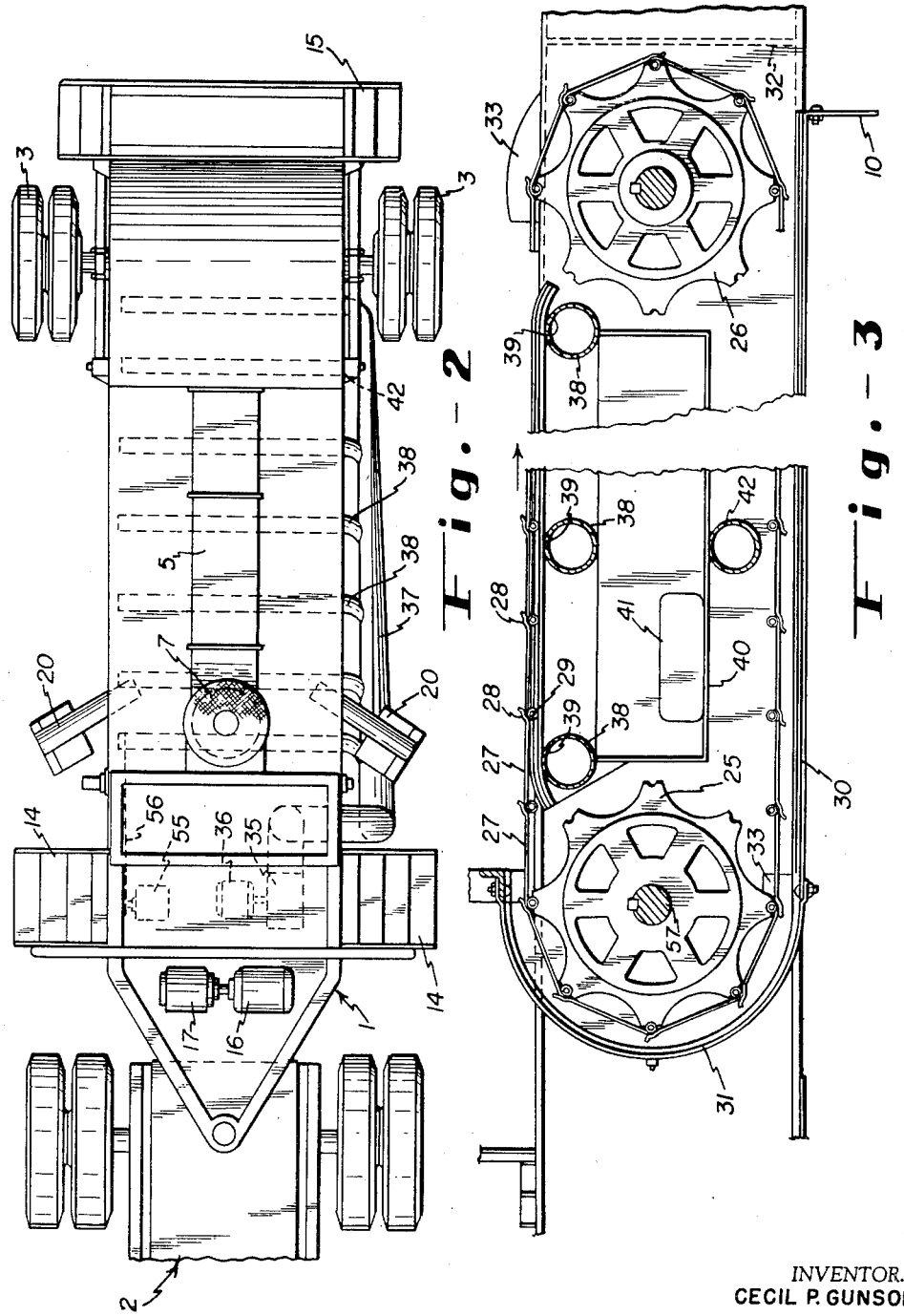

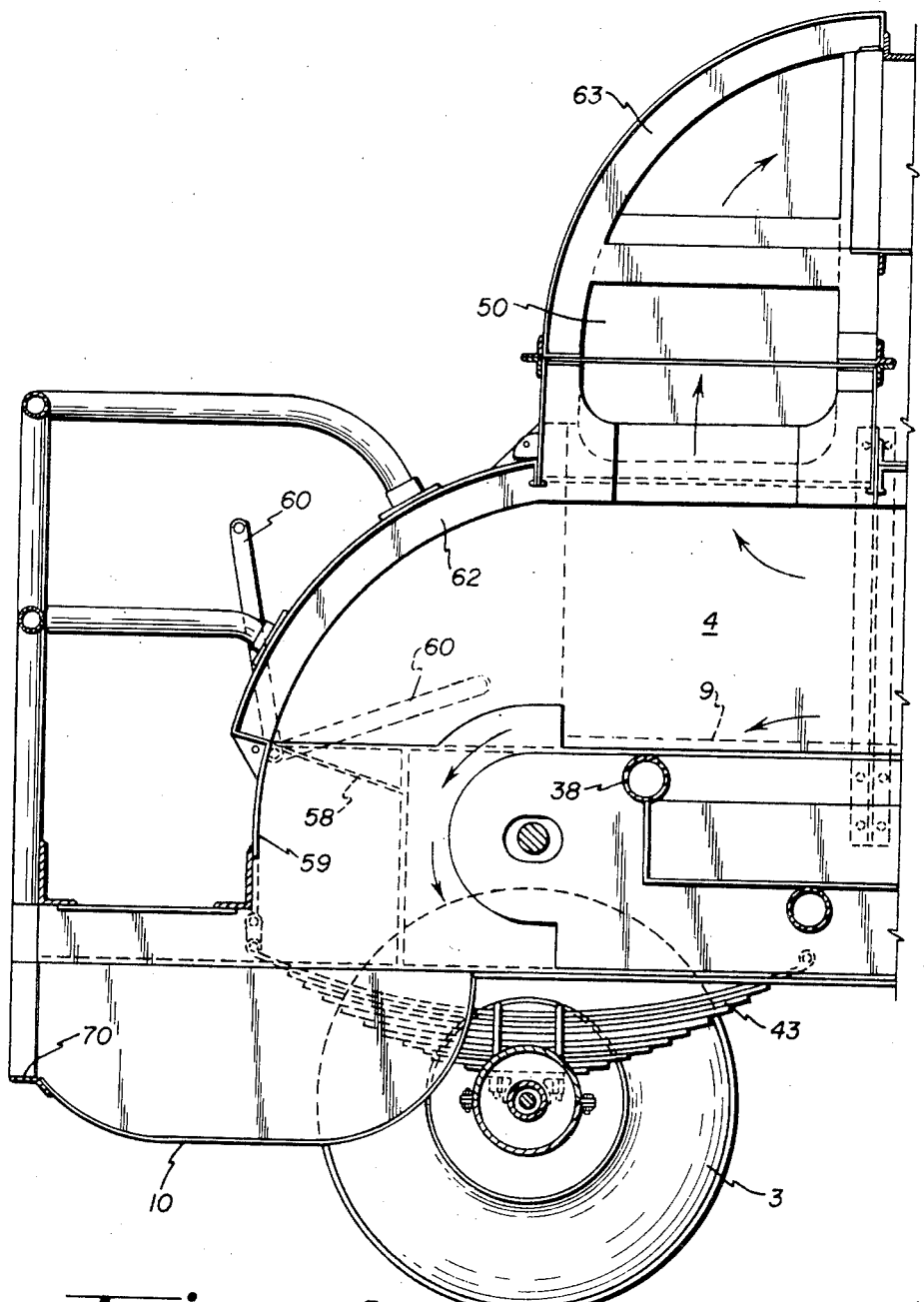

United States Patent Office 3,038,421
Patented June 12, 1962

3,038,421
MOBILE INCINERATOR
Cecil P. Gunson, 613 St. Paul St., Denver 6, Colo.
Filed July 30, 1959, Ser. No. 833,120
6 Claims. (Cl. 110—18)

This invention relates in general to improvements in mobile incinerators for quickly and smokelessly incinerating small amounts of trash and rubbish as such accumulated trash is picked up from homes in residential sections.

The collection and disposition of waste from modern living is progressively more burdensome to urban areas where not only has the population rapidly increased, but the amount of trash and waste for ordinary living has also rapidly increased. To further complicate the problem, the cost of collection and disposing of the waste materials has, likewise, increased. With the expansion of urban areas the elimination of waste and trash has become an increasing problem since the urban areas quickly engulf prior dumps and disposals. Mobile incinerators have been suggested in the prior art, however, none appear to have been at all successful and none have been utilized, apparently because such devices were not efficient in completely assuming combustible matter, thereby increasing the total amount of smoke in an area and creating a health hazard.

According to the present invention, I have provided an improved device having an elongated fire box in which combustible waste and trash fed into the device is almost completely consumed, and non-combustible matter is accumulated for discarding. A secondary burning zone is provided beyond a primary combustion zone in the device to completely incinerate any combustible material which passes the primary zone without incineration. A moving grate is provided in the primary combustion zone to hold all material in a flame for incineration and to slowly remove non-combustible material and ash from the incineration. The device provides an effective draft system to insure complete combustion throughout the elongated primary fire box, further insuring the combustion of matter to substantially smokeless products.

Included among the objects and advantages of the present invention is a mobile incinerator arranged to completely incinerate portionwise the combustible material of accumulated trash and waste material substantially as it is picked-up in residential sections of urban areas. The device provides an efficient and effective double combustion zone which insures complete combustion of combustible matter to smokeless gaseous products of combustion and non-combustible ash. The device provides an effective and efficient draft system which provides an excess of air to insure combustion at all points along both combustion chambers of the device, and provides an efficient draft system which is arranged to prevent a single blast of air from a single entrance.

These and other objects and advantages of the invention may be readily ascertained by referring to the following description and appended illustrations which:

FIG. 2 is a top plan view of the device of FIG. 1;

FIG. 3 is a detailed, longitudinal cross-sectional view of a moving grate for a primary fire box of an incinerator according to the invention;

FIG. 4 is a detailed, longitudinal cross-sectional view of the non-combustible discharge section of the incinerator according to the invention.

Figures 1, 5:
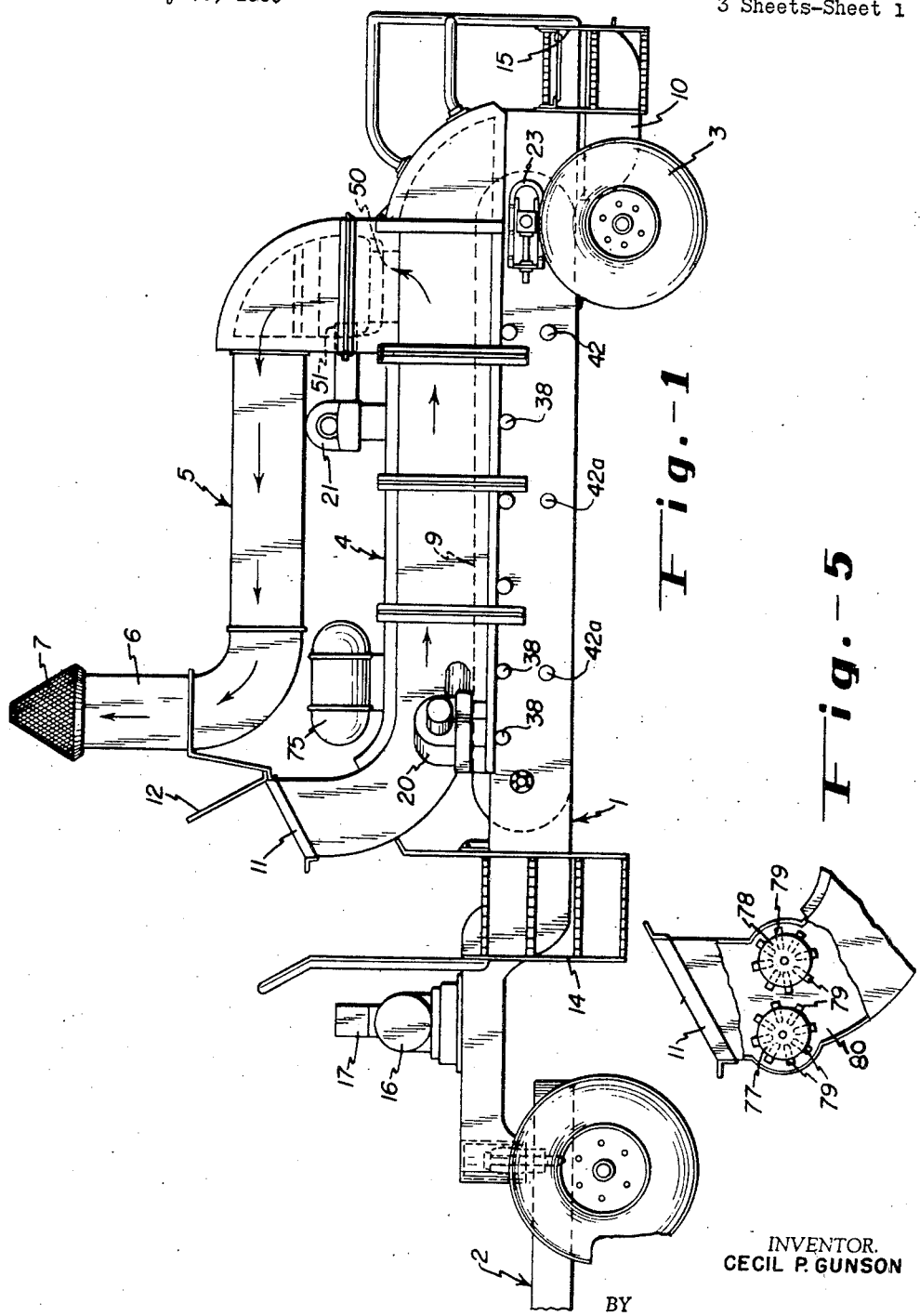
FIG. 1 is a side elevational view of a mobile incinerator according to the invention.
FIG. 5 is a modified feed inlet to an incinerator of the invention utilizing the hammer mill to break-up large pieces of waste matter.

The device of the invention in a preferred form comprises a wheeled frame, shown in general by numeral 1, arranged to be secured to a truck or prime mover, only partially shown in general by numeral 2. The device may be considered a semi-trailer with its front end mounted on a prime mover and having only one set of wheels at the rear, designated by numeral 3. It is, however, obvious that the device may be made as an integral part of the truck or as a complete trailer or any other means desired.

The device includes a generally horizontal, elongated primary burning chamber indicated in general by numeral 4, and a secondary elongated, generally horizontal burning chamber indicated in general by numeral 5. Passage of material through the burning chamber 5 is generally of a reverse flow to that of the primary burning chamber 4. Gaseous material resulting from combustion exhausts through a stack 6 from the secondary chamber 5. A spark screen 7 prevents release of fly ash, sparks and burning material which would otherwise be carried out by the relatively fast flow of gas from the incinerator. A moving endless chain grate 9 carries fed matter through the combustion chamber in contact with flames. Incombustible material is discharged from the grate into an ash storage and removal pit at the rear of the device. The primary burning zone 4 is fed through feed inlet 11 which has a hinged cover 12. The hinged cover may, of course, be connected to a foot actuated pedal to aid the operator in dumping waste into the inlet as is common with stationary incinerators. To facilitate operation, the feed inlet 11 is approached by a set of steps 14 provided on either side of the trailer. To service the rear end of the trailer, another set of stairs 15 is provided. On the front of the trailer a generator 16 driven by internal combustion engine 17 provides electricity for driving the drive motor for the chain grate 9, for the motors of the draft and burner system, each of which are described in detail below, and for such lights and other motors as may be necessary for satisfactory operation.

A pair of oil burners 20 are provided on either side of the main combustion chamber 14 and a single oil burner 21 is provided in the throat 50 leading to the secondary burning section 5. The chain grate passing through the primary burning section 4 is provided with a take-up, self-aligning, bearing device 23, which is common in the art, which maintains the grate under proper tension.

The chain grate, which is illustrated in detail in FIG. 3, includes a drive sprocket 25 and an idler sprocket 26, the idler sprocket being connected with the movable self-aligning bearing unit. The grate includes a plurality of hingedly interconnected links 27 in endless connection and which are arranged to go around each of the sprockets and form the endless grate. Each link of the grate includes a drag rib 28 mounted above a hinge 29 between each of the sections. The drag rib not only protects the hinges but is arranged to carry any material on the grate therealong and to prevent it from merely rolling in place jamming incoming material. Each of the links is perforated to provide for the passage of air. Air is introduced into the burning chamber through the grate from tubes 38 described below. The grate is mounted in the housing which includes a belly plate 30, end plates 31 on the drive-in, and an end plate 32 on the idler end. A deflector plate 33 covers the sprocket on idler end to prevent material jamming the teeth and grate and end plates in the event any material falls off the grate into the bottom of the grate section. Air is blown through the inlet tubes and subsequently through the perforated grate section by means of a blower 35, run by motor 36, illustrated in FIG. 2. A manifold 37 extends from the blower 35 to a series of the inlet nostril tubes 38 which extend along and underneath the upper stretch of the grate. Each of the nostril tubes includes a slot 39, which may, also, be a series of holes directed upwardly toward the grate and rearwardly with the direction of travel of the grate so that draft air passing through the grate gives impetus to the burning gases toward the secondary burning zone thereabove. A pit 40 is provided below the upper stretch of the grate to collect any ash which may drop through the grate, and clean-out holes 41 are provided for removal of the ash. Tubular frame supports 42 and 42a extend cross-ways of the trailer and frame support 42 also supports the front of springs 43 of the trailer.

Gaseous products and light material from the primary burning section are carried along by the blast of gas and pass up through throat 50 past a burner nozzle 51 of burner 21, and then into the horizontal stretch of the secondary burning chamber 5. The burner 21 provides additional flame and heat to aid combustion of unburned combustible material, and it insures that partially consumed combustible material will be completely burned to smokeless gaseous materials. The spark screen 7 retains larger pieces of solid matter and sparks in the stack until burned or reduced in size to pass the screen.

A motor 55, FIG. 2, which drives the chain 56, is interconnected to and drives shaft 57 of the sprocket 25, and provides a motivated power for the grate. Material resting on the grate 9 is moved therealong by the movement of the grate, and the unconsumed material moves toward the idler end of the grate where it is subsequently dumped from the grate as it passes over the rear sprocket 26 into the pit or sump 10. A movable baffle 58 is arranged to partially close the discharge throat 59 of the primary burning section 4 to prevent large unconsumed or incompletely burned materials from passing into the sump 10. The unconsumed material may, thus, be held in the burning compartment for a longer period of time. The baffle 58 is controlled by means of a handle 60, which when moved into position, shown in dashed lines, completely opens the throat 58 permitting all material on the grate to dump into the sump 10. An insulated wall 62 insulates the rear chamber of 4, and insulated wall 33 insulates the throat section 50 leading into the upper burner 5. An opening 70 which has a closable door, not shown, provides means for emptying this sump 10.

In one preferred form, the burning of the incinerator is controlled by means of oil burners, and an oil tank 75 provides oil to each of the burners. Since a very hot fire must be utilized to completely consume the variety of materials found in trash, which includes wet and dry materials, the burners should be of the forced air type. The power for the burner motors is provided by the small power plant 16 on the front of the trailer.

During operation of the device, oil is burned at a very high temperature in the forced air burners, and the nozzles of the burners are directed through the primary chamber 4, rearwardly along the direction of the travel of the grate. Material fed into the device through the throat 11 rests on the grate and comes into contact with the flame. The forced air from the nostril tubes provides additional air for the burning while the material is traveling along the grate. The rate of travel of the grate is controllable for maximum efficiency. As the material on the grate approaches the end of the primary chamber, the non-combustible material is passed into the sump while the lighter material is carried by the gases up through the throat 50 into the secondary burning chamber. In the passage leading to the secondary chamber all the material comes in contact with the flame from the burner 21 which is so directed as to span the throat area. Any material passing up the throat comes into direct contact with the flame, and since there is a blast of air and gas through the device, the flame is, also, carried along into the secondary burning chamber. In normal operation any combustible material will be consumed before it reaches the end of the primary chamber, in some cases, however, very light material or wet material such as paper will be blown under the heavy blast of gas and air through the primary without burning completely. Such material enters the throat 50 where it is contacted with the flame from the burner, and since it is a restricted passage, the material should be ignited and quickly consumed.

Since it is not always possible to guaranty only combustible matter in residential trash and waste, in some instances it may be desirable to provide a hammer mill in the feed inlet of the incinerator. For this purpose a pair of hammer mill drums 77 and 78, each having a plurality of pivoted hammers 79 are mounted in the throat 80 leading from the feed inlet 11 into the chamber 4. By spacing the hammer drums from 4 to 8 inches apart small material will pass through while any large material will be broken up or mashed. Such trash as cans will be mashed while bottles and the like will be broken. The hammer mill, further, reduces the possibility of clogging or jamming the grate.

While the invention has been described by reference to a specific device, there is no intent to limit the spirit or scope thereof to the precise details so set forth, and obvious equivalents and substitute are intended to be included within the following claims.

I claim:

1. A mobile incinerator comprising a wheeled frame of a size to readily negotiate urban streets and having mans for propulsion, a first substantially horizontal elongated burning chamber mounted on said frame and divided into an upper combustion portion and a lower grate portion, an endless chain grate mounted in said lower grate portion with its upper stretch arranged to move material from one end to the other in said combustion portion, an upper inlet in said chamber positioned for direction of material through said inlet onto the upper stretch of said grate, a lower ash discharge at the opposite end of said grate extending below the upper stretch thereof, at least one forced air burner mounted on each side of said upper combustion chamber adjacent to said inlet and generally directed horizontally and rearwardly along the travel of said grate, said burners being spaced above and adjacent the top surface of the upper stretch of said grate whereby the flames of said burners extend generally parallel above said grate, means forming a plurality of air inlets spaced along and under the upper stretch of said grate and directed through and generally rearwardly along the direction of travel of said upper stretch of said grate, a baffle disposed in the ash discharge end of said combustion chamber in position to selectively adjustably, partially close the opening into said ash discharge, a second combustion chamber mounted horizontally above and in close proximity to said first combustion chamber, means forming a reverse bend connecting passage which interconnects said first and second combustion chambers, a forced air burner mounted in said connecting passage and disposed generally horizontally whereby gases and suspended material passing from said first to said second combustion chamber are thoroughly mixed and subjected to and intermixed with the flames of the burner in said passage, and stack means at the opposite end of said second chamber for release of gases of combustion to the atmosphere.

2. A mobile incinerator comprising a wheeled frame of a size to readily travel on urban streets and having means for propulsion, a first substantially horizontal, elongated burning chamber mounted on said frame, an upper feed inlet at one end of said chamber and an ash dump at the opposite end thereof, an endless chain grate mounted in said first chamber and arranged to move material from said inlet to said ash dump, a forced air burner mounted on each side of said first chamber and arranged with its nozzle adjacent the inlet end of said first chamber and directed rearwardly thereof, means for introducing a plurality of streams of air through the upper stretch of said grate at spaced points along said first chamber and directed in the direction of travel of said upper stretch of said grate, a second substantially horizontal burning chamber disposed above and in proximity to said first burning chamber and extended in the opposite direction thereof, means forming a connecting passage from the ash dump end of said first chamber to the inlet of said second chamber and forming the only gas outlet for said first chamber, a forced air burner arranged with its nozzle directed horizontally into said connecting passage, and stack means for releasing gaseous products of combustion interconnected with the discharge end of said second chamber.

3. A mobile incinerator according to claim 2 in which a hammer mill is mounted in said inlet for a preliminary break-up of fed material.

4. A mobile incinerator comprising a wheeled frame of size to readily travel on urban streets and having propulsion means, a first horizontally disposed elongated burning chamber mounted on said frame, a feed inlet mounted above one end of said first chamber and a passage way interconnecting said inlet with said chamber, an ash pit mounted at and below the opposite end of said first chamber, an endless grate extending through said first chamber and arranged for moving material from the feed end to the ash pit end and arranged to discharge material into said ash pit, a baffle mounted adjacent to the ash pit end of said first chamber and arranged to selectively open and to partially close the opening to said ash pit so as to adjustably hold back large pieces of material from said ash pit, at least a pair of burners mounted in opposited positions in said first chamber adjacent the inlet end thereof above said grate and directed horizontally toward the ash pit end, means forming a plurality of air inlets mounted beneath the upper stretch of said endless grate and directed to force air through and directed rearwardly of the upper stretch of said chain grate, a second horizontal burning chamber mounted above said first chamber and extending in the opposite direction so as to reverse direction of travel of material passing from said first to said second chamber, a connecting throat section extending from the ash pit end of said chamber to the inlet end of said second chamber and forming the only discharge for gas and suspended material from said first chamber, a burner arranged with its nozzle in said throat directed laterally to material flow therein, and an upwardly extending gas stack mounted at the opposite discharge end of said second chamber.

5. An incinerator according to claim 4 in which the second chamber is of substantially smaller cross-sectional dimensions than said first chamber.

6. A mobile incinerator comprising a wheeled frame of a size to readily travel on urban streets and having propulsion means, a first horizontally disposed elongated burning chamber mounted on said frame, a feed inlet mounted above one end of said first chamber and a passage way interconnecting said inlet with said chamber, an ash pit mounted at and below the opposite end of said first chamber, an endless chain grate extending through said first chamber arranged for moving material from the feed end to the ash pit end and arranged to discharge material into said ash pit, a baffle mounted adjacent to the ash pit end of said first chamber and arranged to selectively open and to partially close the opening to said ash pit so as to adjustably hold back large pieces of material from said ash pit, at least a pair of forced air burners mounted in opposited positions in said first chamber adjacent the inlet end thereof and horizontally directed toward the ash pit end, means forming a plurality of air inlets mounted beneath the upper stretch of said endless grate and directed to force air through and directed rearwardly of the upper stretch of said chain grate, a second horizontal burning chamber of substantially smaller cross-section dimensions than said first chamber mounted above said first chamber and extending in the opposite direction so as to reverse direction of travel of material passing from said first to said second chamber, a connecting throat section from the ash pit end of said first chamber to the inlet end of said second chamber forming the only discharge for gas and suspended material from said first chamber, a burner arranged with its nozzle in said throat directed laterally to material flow therein, and an upwardly extending gas stack mounted at the opposite discharge end of said second chamber.

References Cited in the file of this patent

UNITED STATES PATENTS

| | | |
|---|---|---|
| 1,714,678 | Kreisinger | May 28, 1929 |
| 1,832,459 | Haniman | Nov. 17, 1931 |
| 2,024,652 | Martel | Dec. 17, 1935 |
| 2,127,328 | Egan | Aug. 16, 1938 |
| 2,601,657 | Brandt et al. | June 24, 1952 |
| 2,838,014 | Sherman | June 10, 1958 |